Jan. 15, 1957  R. C. RUSSELL  2,777,542
FRICTION BRAKE
Filed Dec. 2, 1952  6 Sheets-Sheet 1
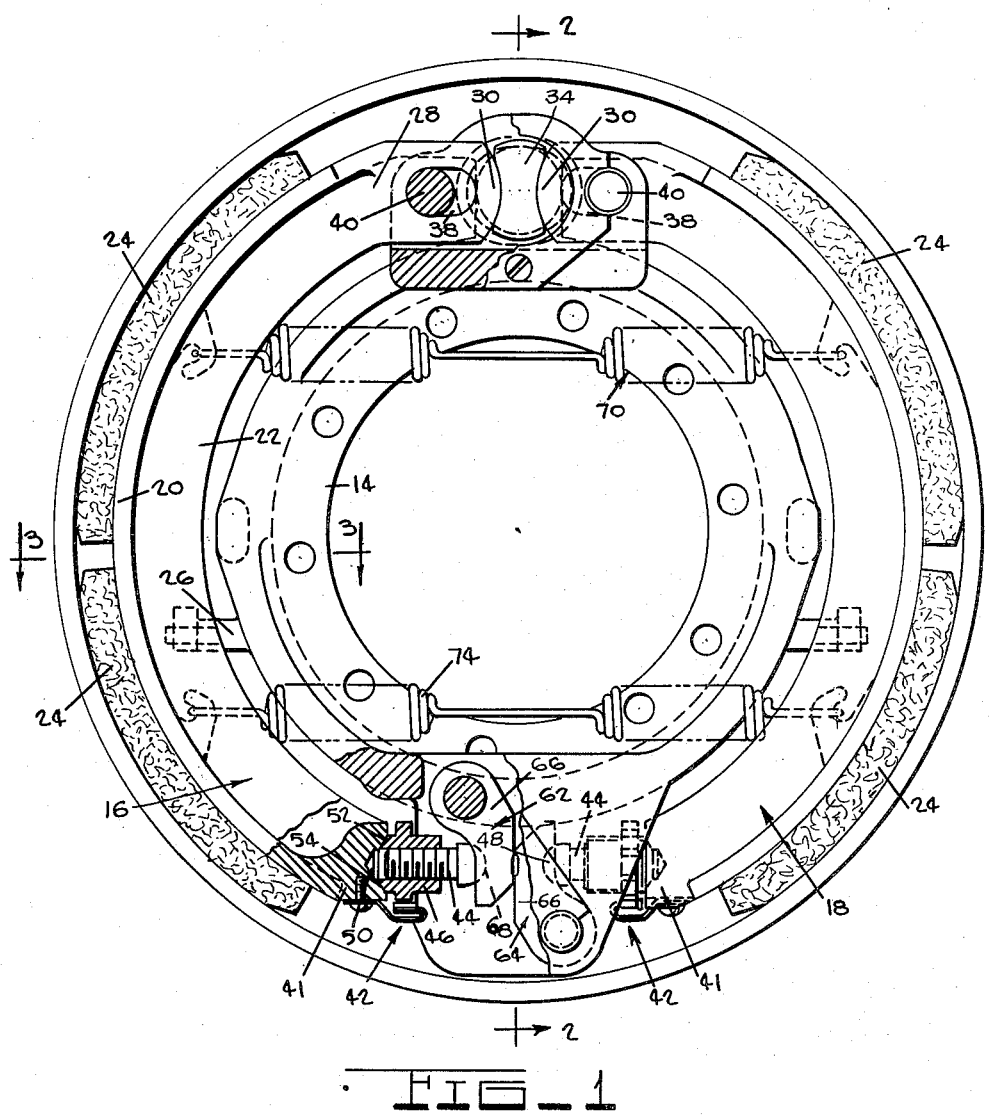
FIG_1
INVENTOR.
ROBERT C. RUSSELL
BY
McDonald & Shagro
ATTORNEYS

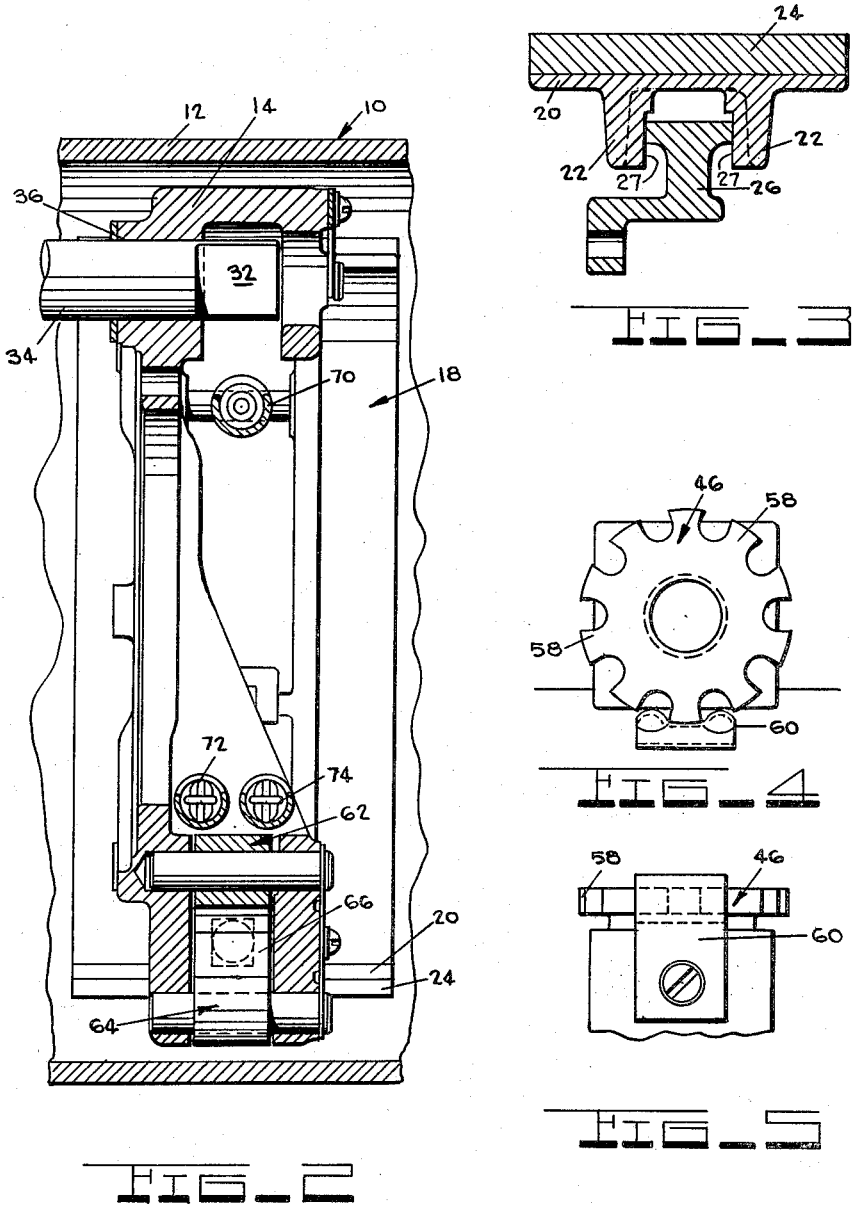

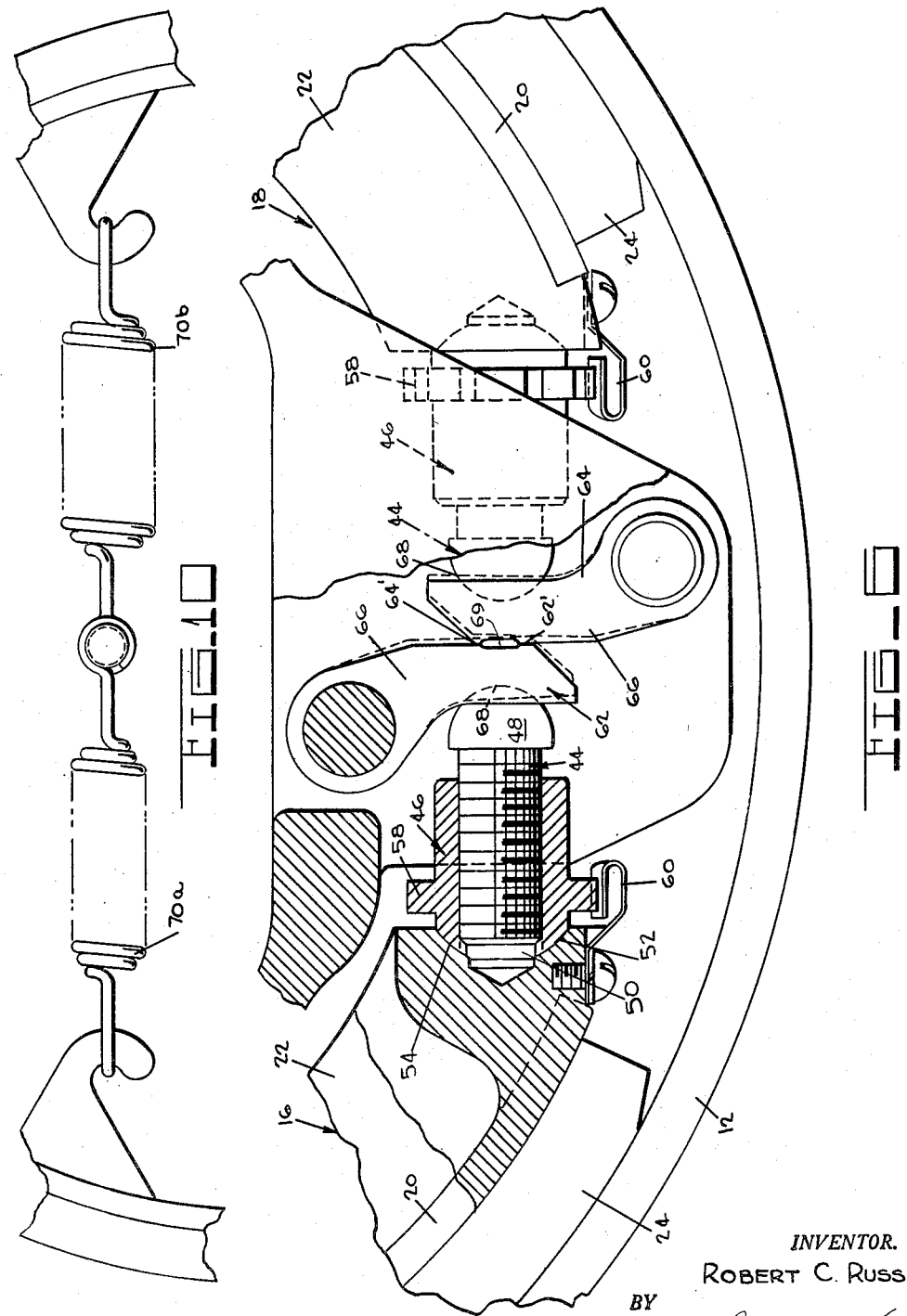

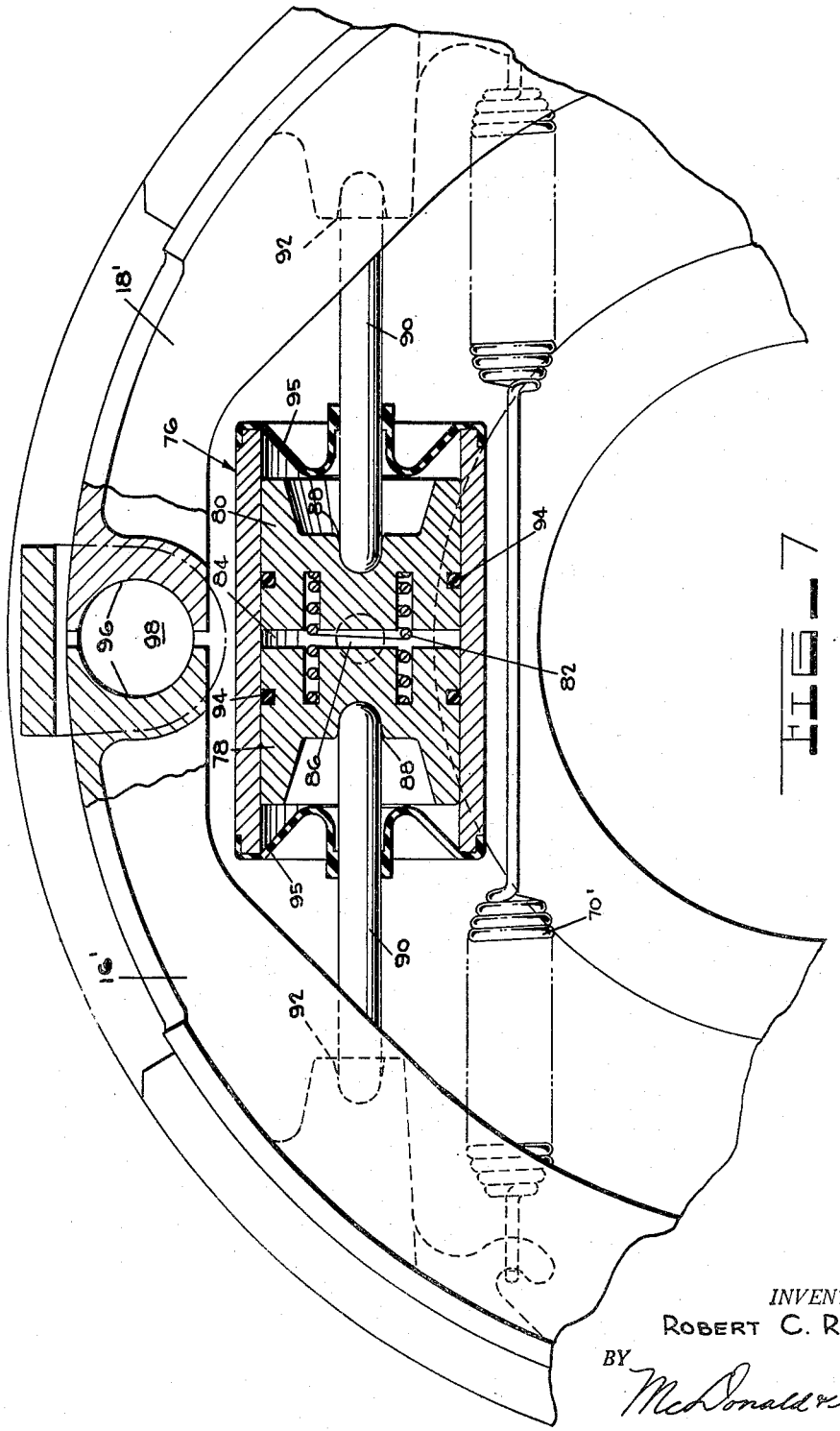

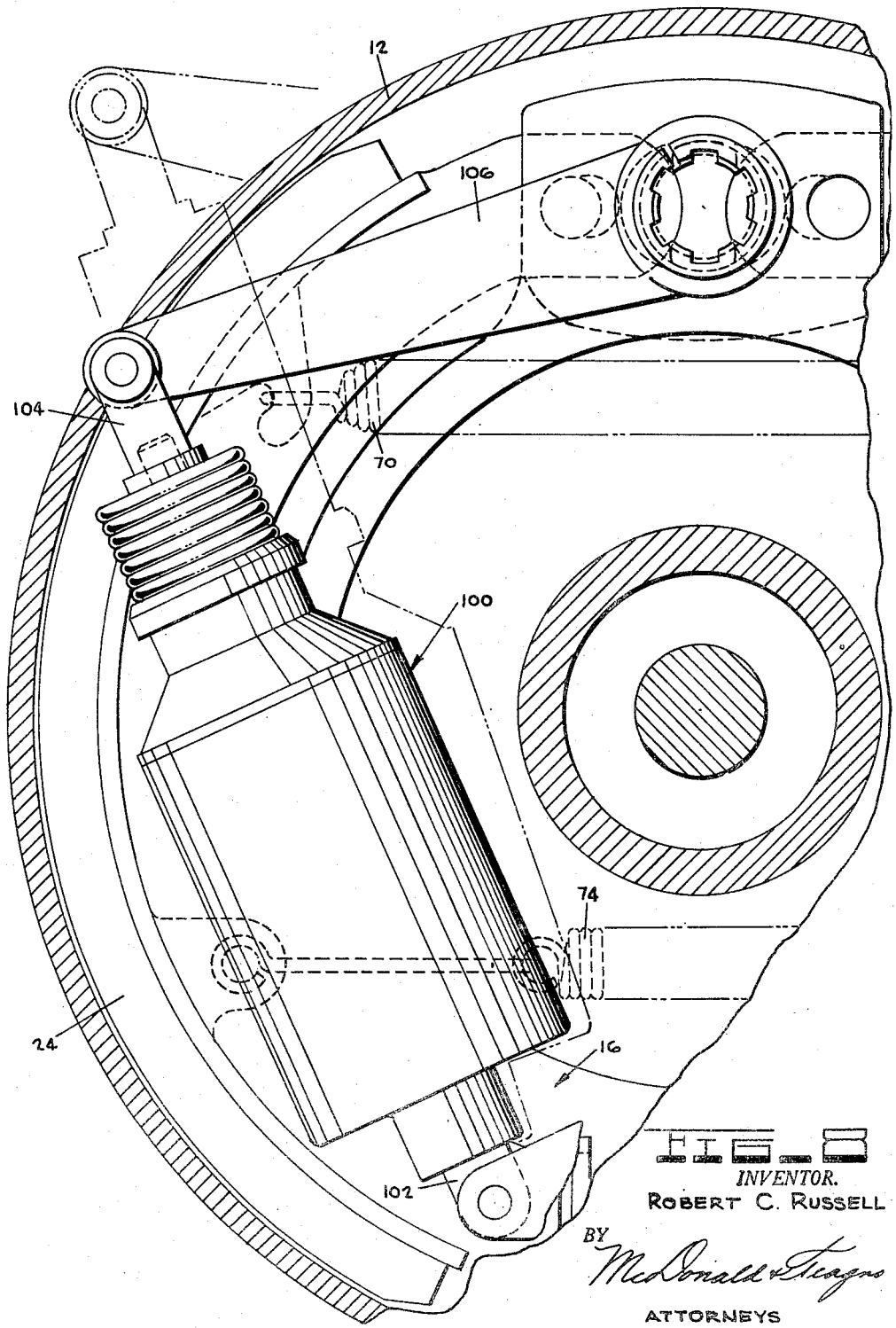

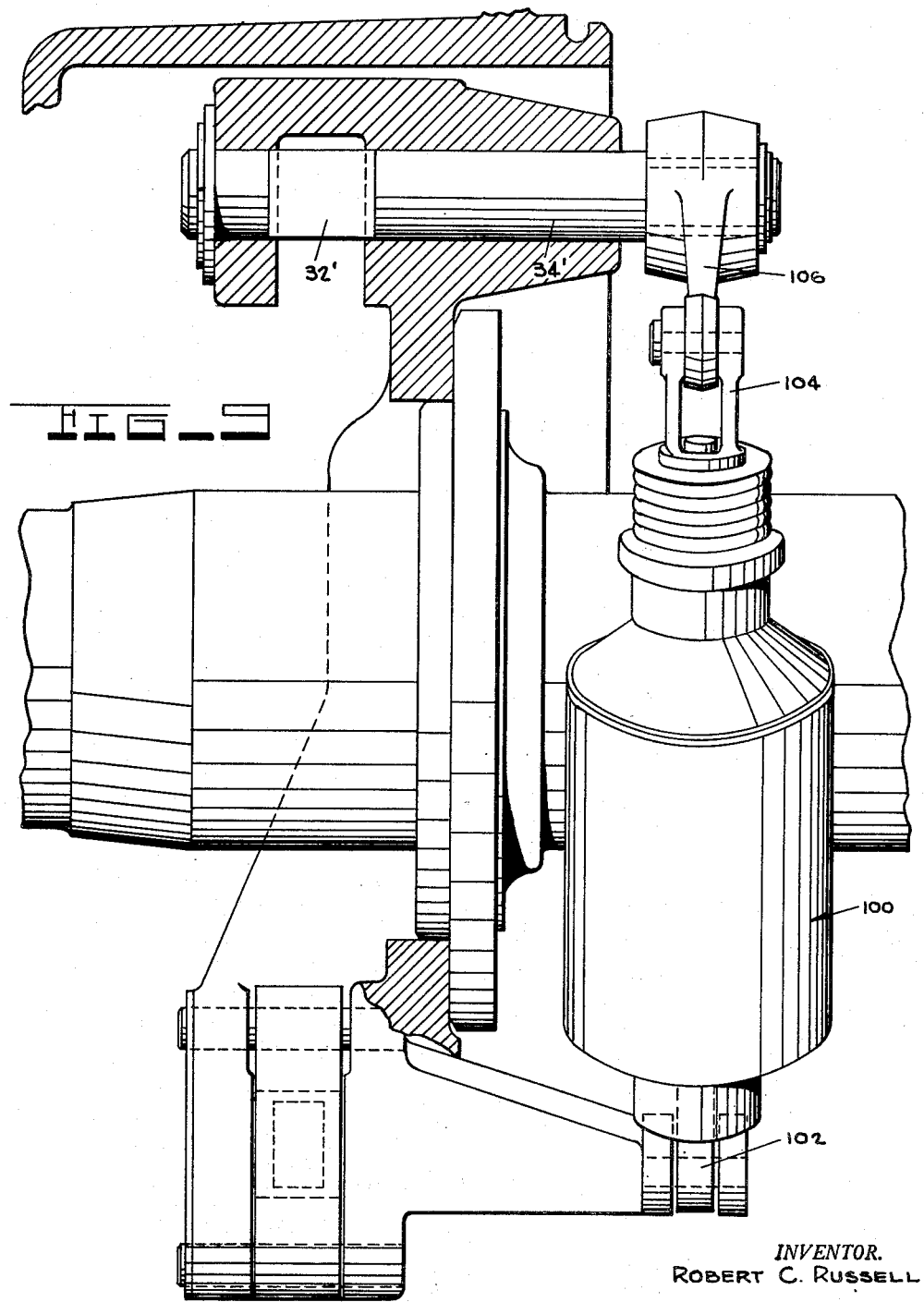

United States Patent Office 2,777,542
Patented Jan. 15, 1957

2,777,542
FRICTION BRAKE

Robert C. Russell, South Euclid, Ohio, assignor to Eaton Manufacturing Company, Cleveland, Ohio, a corporation of Ohio Application December 2, 1952, Serial No. 323,565

9 Claims. (Cl. 188—78)

This invention relates to braking and more particularly to friction brakes for vehicles.

Broadly the invention comprehends the provision of an actuated two-shoe brake mechanism wherein equalized braking is accomplished. Although the equalized braking of two shoes is not new, the present structure for the achievement thereof is believed novel. The present structure is equally adaptable to the mechanical or hydraulic fluid actuation of the brake shoes and includes as a basic portion thereof equalizing means between the ends of the brake shoes opposite from the actuated ends thereof so that the shoes can perform an equal braking force in forward or reverse.

Among the principal objects of the invention is the provision of an actuated two shoe friction brake for vehicles, that:

(a) Is effective to provide equalized braking of each shoe;

(b) Is simple and economical of structure;

(c) Provides means whereby either shoe can be so controlled to do a greater or lesser amount of braking than the other shoe;

(d) Provides a symmetrical structure whereby the shoes are interchangeable;

(e) Includes a floating cam permitting of transmitting braking reaction from one shoe to the other and for equalizing wear between the shoes;

(f) Includes lever means at the ends of the shoes opposite the actuating ends thereof for effecting a brake equalizing action between the shoes;

(g) Can be operated in reverse or forward braking with equal effectiveness;

(h) Provides for the equalized energization of both shoes in forward and reverse with a single input actuating means;

(i) Is adaptable for the actuation thereof by mechanical means, air pressure, vacuum, or hydraulic means; and (j) Requires approximately only ½ of the braking force necessary for a brake structure of like size and capacity which does not employ an equalizing means, as herein devised.

Other objects and advantages of the invention will appear from the following description taken in connection with the drawings forming a part of the specification, and in which:

Fig. 1 is a cross-sectional view taken through a vehicle brake embodying the invention and showing the brake shoes in elevation;

Fig. 2 is a cross-sectional view taken substantially along lines 2—2 of Fig. 1;

Fig. 3 is a cross-sectional view taken substantially along lines 3—3 of Fig. 1;

Fig. 4 is an enlarged view of the adjusting means for one of the brake shoes;

Fig. 5 is a bottom elevational view of Fig. 4;

Fig. 6 is an enlarged fragmentary view of the anchor end of the brake shoes;

Fig. 7 is a fragmentary, partially cross-sectionalized elevation view of a modified form of actuating means for the brake structure of Fig. 1;

Fig. 8 is a fragmentary cross-sectional view through a brake of similar design as Fig. 1 wherein air pressure means are provided for the actuation thereof;

Fig. 9 is a partly cross-sectionalized, side elevation view of Fig. 8; and

Fig. 10 is a fragmentary view of a modified tension spring arrangement for any of the structures hereinbefore disclosed.

Similar reference characters indicate corresponding parts throughout the several views of the drawings.

This brake was devised primarily for the purpose of providing a two-shoe brake mechanism having equalized braking that is suitable for heavy duty brake application for trucks and the like. In being able to utilize a single input actuating means in the form of a floating cam or a conventional hydraulic wheel cylinder for a two shoe brake together with a novel anchorage for the shoes, whereby a proportionate amount of power delivered to one shoe is transmitted to the other, an equalized braking of both shoes is achieved. The ends of the shoes opposite from the actuating means therefor have equalizing means in the form of engaging levers disposed therebetween, one associated with each shoe.

Referring to the drawings for more specific details of the invention 10 represents generally a friction brake comprising basically a rotatable brake drum 12, a stationary support or backing plate 14, and a pair of brake shoes 16 and 18 respectively.

The brake shoes 16 and 18 each have flange and web sections 20 and 22 substantially of T-shaped cross-section with the flange forming the top of the T and the webs being two in number for each shoe forming the stem of the T. The flanges 20 are arcuate in form adapted to conform to the shape of the drum interior and support on the periphery thereof brake lining segments 24 adapted to have braking cooperation with the inner peripheral surface of the drum.

The brake shoes are arranged in the drum with the webs 22 of each shoe receiving therein a supporting bracket 26 mounted in stationary relation on the support 14, said brackets being in sliding contact with surfaces 27 of the shoes and assisting in supporting and guiding the expansive movement of the shoes relative to the drum and also allowing circumferential movement of the shoe with respect to the supporting bracket 26.

One end 28 of each of the shoes terminates in a convexly curved surface flange 30 engageable when the shoes are at rest, with the oppositely complementary disposed concavely curved surfaces of an actuator cam 32 including an integral shaft 34 mounted for floatable rotation in support 14. As will be noted in Fig. 2 the shaft 34 is fitted in an elongated slot 36 permitting of the horizontal movement of the shaft but at the same time preventing the vertical movement thereof, the purpose of which will hereinafter appear.

An elongated slot 38 near the actuated end 28 of each shoe receives an anchor pin 40 therein, said pin being fixedly secured to the support 14, the purpose of which will hereinafter appear.

The free end 41 of each of the brake shoes has an adjusting device 42 including a threaded bolt 44 threadingly engaged with an adjustment nut 46, the one end 48 of the bolt being hemispherically formed. A spherical surface 52 provided on one axial end of the nut is received for bearing movement on a complementary spherical surface 54 formed adjacent the open end of cavity 50 of the shoe.

The nuts 46 are each provided with equi-circumferentially spaced ears 58 adapted to be engaged by resilient fingered elements 60 supported on their respective brake shoe for maintaining an adjusted position of the nuts.

A pair of levers 62 and 64 are pivotally supported on support 14, and each includes a lever arm 66, one side of which is flat and the opposite side of which has a circular shaped socket 68 adapted to receive the hemispherically shaped cap 48 of the bolt 44 therein. The socket 68 is purposely made a slight amount larger than the cap so as to prevent any seizure as relative motion takes place therebetween. The flat side of each of the lever arms is provided with a recess 69. These recesses are provided merely to insure a distinct separation of the contact points 62' and 64' and in the event that the flat sides of the levers wear, the contact points will not be appreciably changed.

The flat sides of the levers as noted by Fig. 1 are adapted to bear against one another whereas the hemispherically shaped portion 48 of bolt 44 cooperating with shoe 16 and the hemispherically shaped portion 48 of bolt 44 cooperating with shoe 18 are adapted to be received in the sockets 68 of the respective levers 62 and 64.

The arms 66 of levers 62 and 64 are purposely made with the arms offset to one side of center so that the arms can only be assembled one way on their respective pivot anchors for a proper functioning thereof in association with the brake shoe mechanism provided.

Tension springs 70, 72 and 74 connected appropriately between the brake shoes at spaced points serve to maintain the ends of the respective shoes in engagement with the actuator cam 32 and the levers 62 and 64.

Through the provision of the convex-concave surfaces of flange 30 and actuator cam 32, an assured uniform condition of operation of the brake shoes results for an established degree of movement of actuator cam 32 regardless of the adjusted position of the free ends 41 of the shoes inasmuch as the curved surfaces of the actuator and ends of shoes maintain a constant condition of engagement for any angular movement of the shoes relative to the actuator cam.

In a normal operation of the brake assuming the component parts thereof to be of the condition and in the position of rest shown by Fig. 1 and with the drum rotating in a counterclockwise direction, a rotation of shaft 34 to effect a braking operation results in a simultaneous rotation of actuator cam 32 effective to expand the brake shoes 16 and 18 radially outwardly toward the drum 12.

Assuming a force of 100 lbs. available from actuator cam 32 being imposed against shoe 16, self energization of shoe 16 due to the direction of rotation of drum 12 will result in a force of approximately 200 lbs. at the adjustment device of shoe 16. If this force were permitted to be applied to shoe 18 directly, shoe 18 would in due course be doing considerably more braking than shoe 16. As a means of rectifying this condition the levers 62 and 64 are provided so arranged and in engagement with one another whereupon as the force of 200 lbs. at the adjustment device for shoe 16 is transmitted by way of nut 46 and bolt 44 of device 42 of shoe 16 to lever 62, the force is reduced back to 100 lbs. being imposed on shoe 18. This is possible inasmuch as the force delivered to lever 62 is as noted in Fig. 6 transmitted from lever 62 to lever 64 by way of point 62' on lever 62 engaging lever 64 on the flat side of its lever arm 66. The distances from the pivot point of lever 62 to the point 62' and from the pivot point of lever 62 to the midpoint of socket 68 are in the ratio of approximately 1.3 to 1 where the characteristics of the brake shoe are such that the self-energization factor doubles the force available at the adjustment device, as compared to the force available at the actuator cam. Therefore, it is obvious that the self-energization factor of the shoe determines the particular geometry requirement of the lever system. Also, the geometry of lever 64 is the same as that of lever 66, which is explained above. With this lever arm arrangement the 200 lbs. at lever 64 becomes 100 lbs. at the adjustment device 42 of shoe 18.

With shoe 18 being supplied an input force of 100 lbs., an equal amount to that supplied shoe 16, it also will develop, due to self-energization, an abutment force of 200 lbs. at its end 28 engageable with the cam actuator. With the flanged end 30 of brake shoe 18 having anchor pin 40 received in slot 38 thereof, the shoe 18 as actuated by way of levers 62—64 from shoe 16 becomes anchored on pin 40 while it simultaneously reacts against the cam actuator to effect movement thereof. This movement of the cam actuator although acting to move the shoe 16 into the drum does not in any way affect the actuation force of 100 lbs. supplied to the shoe 16 by the cam actuator.

As a result of the initial movement of the cam actuator 32, the ends of the shoes in engagement therewith are moved outwardly away from anchor pins 40, received in the slots 38 of the respective shoes, and into engagement with the drum but the subsequent movement of shoe 18, by way of the levers 62—64, results in shoe 18 reacting against the cam actuator 32. Cam actuator 32 is thereby moved an amount permitting of the anchoring of shoe 18 on pin 40, which movement of the cam actuator 32 results in its reaction back to the actuating means therefor. By reason of this braking reaction through brake 18 and cam actuator 32, roughly only about one half the brake applying power is necessary as compared to brake structures of like size and braking capacity which do not employ an equalizing means as herein described. Further, since shoe 18 has to react against the cam actuation in moving to its anchored position, a cushioning thereof occurs resulting in a shock free braking operation. This actuation of the brake mechanism although described in connection with a counter-clockwise rotation of the drum, is applicable likewise to a clockwise rotation of the drum wherein the shoe 16 reacts against the actuator instead of shoe 18.

The circular ends of the bolts 44 as received in the complementary circular sockets of the respective levers are free to move therein angularly relative thereto as shown by Fig. 6 and concomitantly therewith as shown by Fig. 6 the spherical portions 52 of the nuts 46 are free to move on the complementary spherical surfaces 54 at one end of the respective shoes 16 and 18.

The cam actuator in its floating capacity in addition to being effective to equalize the braking action of the shoes also provides for equalizing any difference in wear of the lining of the shoes, that is the cam actuator by reason of its free shiftable movement with the one end of both shoes compensates for any otherwise excessive wear of one shoe lining or the other.

By reason of the symmetry of brake design provided a clockwise rotation of the drum will be braked with equal effectiveness as the previously recited counter-clockwise rotation braking. In this instance the shoe 18 is the lead or initially braked shoe whereby through the self-energization thereof a greater force acts at the adjustment device end thereof than is supplied to the actuated end thereof such that this greater force as transmitted to levers 64 and 62 accounts for the supplying of a brake force to shoe 16 at its adjustment end substantially equal to the force supplied shoe 18 at its actuated end. The force thus supplied shoe 16 and through the self-energization thereof results in a like abutment force at the anchor end of shoe 16 as for the force at the adjustment device end of shoe 18 whereby as the shoe 16 anchors on pin 40, an equalized braking force of both shoes is attained.

Since points 62' and 64' are the controlling leverage transmittal points between the levers 62 and 64 dependent on whether a forward or reverse braking action is being effected, it is obvious that through the alteration of the pivoted length thereof any proportionate amount of the force delivered to the levers could be transmitted from one shoe to the other so as to accommodate any particular comparable braking force of the shoes to be desired.

Adjusting devices 42 can be operated to compensate for wear in the linings merely by rotating the nuts 46 relative to the bolts whereby the shoes are thus projected radially outwardly toward the drum wherein the resiliently fingered element 60 secured to each of the shoes 16 and 18, and engageable with the ears 58 of the nuts 44 serves to maintain each adjusted position of the devices 46.

Fig. 7 illustrates the utilization of hydraulic means for the actuation of the brake shoes of the structure of Fig. 1 wherein a like equalizing means as levers 62—64 is employed.

The hydraulic means is in the form of a wheel cylinder 76, mounted securely to the mounting plate for the brake, having opposed pistons 78 and 80 reciprocable therein and normally held apart by a coil spring 82 arranged therebetween. A fluid chamber 84 is formed between the pistons supplied hydraulic fluid thereto from a source, not shown, by way of inlet port 86 formed in the cylinder. The pistons each have sockets 88 formed in their outward axially disposed ends for receipt therein of short rods 90, with said rods 90 in turn each being received respectively in a socket 92 of the forward and reverse brake shoes 16' and 18'. An annular seal 94 is arranged appropriately in the periphery of each piston for the purpose of inhibiting the leakage of hydraulic fluid from the cylinder therepast. Resilient boots 95 are arranged on the opposite ends of the cylinder secured between the cylinder ends and rods 90 for inhibiting foreign matter from entering the inner confines of the cylinder.

Shoes 16' and 18' extend circumferentially beyond the socket ends 92 thereof and have arcuate end surfaces 96 therein adapted to have anchor bearing relation upon an anchor post 98.

With the pressure removed from the hydraulic fluid supplied to the wheel cylinder 76, tension spring 70' serves to hold the end surfaces 96 of the brake shoes on anchor post 98, whereas spring 82 maintains the pistons spaced apart as shown by Fig. 7. Upon the supply of pressure fluid to chamber 84 the pistons are moved axially apart effective by way of the rods 90 to actuate the shoes into engagement with the drum of the brake. At this time through the medium of levers 62—64 an equalizing brake effect is accomplished wherein instead of the cam 32 of the structure of Fig. 1 being moved as the one shoe reacts thereagainst, the one piston moves the fluid trapped between the pistons and effects a like result. Thus a comparable braking result is accomplished whether a direct mechanical or hydraulic actuation of the brake shoes, of the present brake structure, is utilized.

Figs. 8 and 9 disclose an air pressure arrangement for the actuation of the basic brake structure of Fig. 1 wherein an air cylinder 100 has one end 102 pivotally mounted on the brake support plate and a rod extension 104 of a piston reciprocable in the cylinder is pivotally secured to one end of a lever arm 106. The lever arm 106 is in turn secured to a shaft 34' having a cam actuator 32' as a part thereof, engaged with the actuated ends of the brake shoes. The dotted outline of the air cylinder 100, the rod extension 104, and the lever arm 106 of Fig. 8 illustrates a braking position thereof whereas the full line disclosure thereof is when the actuating means for the brake is at rest.

Fig. 10 illustrates a modified tension spring arrangement for any of the brake structures of Figs. 1 through 9 wherein different weight springs 70a and 70b are utilized in place of spring 70 as in Fig. 1. In so having a spring 70b which for example is 100 lbs. as compared to 70a being 75 lbs., it is possible for the brake structure of Figs. 1, 7 or 8 to be arranged in a position rotated say approximately 60° to 90° clockwise wherein the weight of shoe 16 or 16' will tend to pull it away from the drum whereas the weight of shoe 18 or 18' will tend to have it engage the drum. Assuming the weight of each shoe as roughly 12 lbs. the differential of 25 lbs. provided in the springs 70a and 70b will compensate and hold the shoes in substantially balanced or equalized position relative to the drum. A reversal of springs 70a and 70b can be utilized to account for a positioning of the brake structure rotated say 60 to 90 degrees counterclockwise from the position of Fig. 1.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In a brake, the combination of a rotatable drum, a pair of shoes adapted for braking cooperation with the drum and having pairs of opposed ends, actuating means engageable with one pair of said ends to apply the shoes, and means cooperating with the other pair of said ends to substantially equalize the braking action between the shoes comprising a pair of pivotal levers engageable with one another and with one lever engageable with one end of one shoe and with the other lever engageable with one end of the other shoe, said levers being identical in size and shape and each including an arm offset to one side of its pivot axis having a substantially flat surface engageable with the flat surface of the arm on the other lever and said flat surface of each arm being on the outside most remote from the pivot axis of its lever and with the pivot axis of one lever located radially inwardly of its point of engagement with its assocated shoe and the pivot axis of the other lever being disposed radially outwardly of its point of engagement with its associated shoe.

2. A brake according to claim 1 wherein a pair of adjustment means are provided interposed between the ends of the pair of shoes opposite the actuated ends thereof and the respective pivotal levers.

3. A brake according to claim 2 wherein the adjustment means each include threadingly engaged nut and bolt members with each nut bearing against one end of its respective shoe and with its associated bolt bearing against its respective lever.

4. A brake according to claim 1 wherein a stationary support is provided adjacent said drum and said actuating means is a cam having an integral shaft mounted for shiftable circumferential movement, between the shoes, in an elongated slot in the support.

5. A brake according to claim 4 wherein the mechanical element has oppositely disposed curved concave surfaces, and wherein the ends of the shoes engageable therewith each have convexly curved surfaces complementary to the curved concave surfaces of the shoes.

6. In a brake, the combination of a rotatable drum, a pair of shoes adapted for braking cooperation with the drum and having pairs of opposed ends, actuating means cooperating with one pair of said ends to apply the shoes, and means cooperating with the other pair of said ends to substantially equalize the braking action between the shoes comprising a pair of pivotal levers engageable with one another and with one lever engageable with one end of one shoe and with the other lever engageable with one end of the other shoe, said levers being substantially identical in size and shape and the portions thereof engageable with one another lying in a plane passing substantially through the axis of the drum, and wherein the pivot axis of one lever is disposed radially inwardly of its engagement end with its associated shoe end and wherein the pivot axis of the other lever is disposed radially outwardly of its engagement end with its associated shoe end.

7. A brake according to claim 6 wherein the actuating means is a cam floatable substantially circumferentially between the pair of ends of the brake shoes with which engageable.

8. In a brake, the combination of a rotatable drum, a pair of shoes adapted for braking cooperation with the drum and having pairs of opposed ends, actuating means cooperating with one pair of said ends to apply the shoes, means cooperating with the other pair of said ends to substantially equalize the braking action between the shoes comprising a pair of pivotal levers engageable with one another and the one lever engageable with one end of one shoe and with the other lever engageable with one end of the other shoe, a stationary support mounted adjacent the drum, said actuating means being a cam having an integral shaft mounted for shiftable circumferential movement, between the shoes, in an elongated slot in the support, and a pair of anchor pins mounted on the stationary support in spaced relation to one another, said shoes each having an elongated slot near the actuator end thereof for receipt of the respective anchor pins therein, one of said levers having a pivot axis radially inward of its engagement point with one end of its associated shoe and the other lever having a pivot axis radially outward of its engagement point with one end of its associated shoe and wherein the actuating point of engagement of one lever with the other lever is radially intermediate the other lever's pivot axis and its engagement point with its associated shoe and wherein the actuating point of engagement of the other lever with the one lever is radially intermediate the one lever's pivot axis and its engagement point with its associated shoe.

9. In a brake, the combination of a rotatable drum, a pair of shoes adapted for braking cooperation with the drum and having pairs of opposed ends, actuating means cooperating with one pair of said ends to apply the shoes, and means cooperating with the other pair of said ends to substantially equalize the braking action between the shoes comprising a pair of pivotal levers engageable with one another and with one lever engageable with one end of one shoe and with the other lever engageable with one end of the other shoe, said pivotal levers each have an arm extending toward one another with the arms in engagement with one another on one side thereof while the opposite sides thereof engage respective ends of the pair of ends of the shoes opposite the actuated ends thereof.

References Cited in the file of this patent

UNITED STATES PATENTS

| | | |
|---|---|---|
| Re. 18,966 | Lauer | Oct. 10, 1933 |
| 1,930,779 | Snell | Oct. 17, 1933 |
| 1,992,207 | Goepfrich | Feb. 26, 1935 |
| 2,246,242 | Chase | June 17, 1941 |

FOREIGN PATENTS

| | | |
|---|---|---|
| 436,902 | Great Britain | Oct. 21, 1935 |